Dec. 20, 1960  N. J. ACKER ET AL  2,965,369
TRANSFER MECHANISM FOR HEAT TREATING APPARATUS
Filed Dec. 10, 1957  6 Sheets-Sheet 1

INVENTORS
NORMAN J. ACKER
EDWARD P. BLOMQUIST
BY Fred Gerlach
ATTY.

Dec. 20, 1960 N. J. ACKER ET AL 2,965,369
TRANSFER MECHANISM FOR HEAT TREATING APPARATUS
Filed Dec. 10, 1957 6 Sheets-Sheet 4

INVENTORS
NORMAN J. ACKER
EDWARD P. BLOMQUIST
by: Fred Gerlach
ATTY.

United States Patent Office 2,965,369
Patented Dec. 20, 1960

2,965,369

TRANSFER MECHANISM FOR HEAT TREATING APPARATUS

Norman J. Acker and Edward P. Blomquist, Rockford, Ill., assignors, by mesne assignments, to Basic Products Corporation, Milwaukee, Wis., a corporation of Wisconsin Filed Dec. 10, 1957, Ser. No. 701,778

4 Claims. (Cl. 266—4)

The present invention relates to material handling apparatus by means of which an article may be moved progressively along a rectilinear path between various operating stations. More specifically, the invention is concerned with a transfer mechanism whereby work or batch baskets containing miscellaneous steel parts such as screws, washers, spindles, shafts and the like which are to be subjected to heat treatment operations such as case hardening, carburizing, carbo-nitriding and the like may, either by a semi-automatic or fully automatic operation, be introduced into the heat treatment furnace and, after heat treatment therein, transferred from the furnace to the quench elevator associated with a quench tank, from which elevator the work baskets are discharged onto an unloading table after the quench cycle has taken place. It will be understood, however, that although the transfer mechanism of the present invention has been designed primarily for such use, other uses therefor are contemplated and, if desired, the apparatus may, with or without modification, be employed in the transportation of all manner of articles along a desired path for any desired purpose. Irrespective, however, of the particular use to which the present invention may be put, the essential features thereof are at all times preserved.

It is among the principal objects of the present invention to provide an apparatus for automatically charging and discharging a heat treatment furnace and having associated therewith a movable loading head or bail by means of which the work baskets are impelled along a loading table and into the furnace and also having a movable transfer head by means of which the baskets, after heat treatment of the parts contained therein, are discharged from the furnace to the quench tank elevator, together with means for effecting movement of the two heads in timed relation to each other and in timed relation to automatic furnace and quench tank operations so that each head will perform its intended impelling function at an appropriate time with a minimum of supervision on the part of an operator.

It is an equally important object of the invention, in an apparatus of this character, to provide a loading head or bail of novel design which is movable from an out-of-the-way position which will facilitate manual placement of the work baskets on the loading table without interference to an operative position whereby the loading head is in impelling register with a basket so placed on the table so that upon subsequent movement of the loading head through its impelling stroke, the head will advance the basket into the heat treatment furnace.

A further object of the invention is to provide a loading head or bail of this sort which, after its impelling stroke has been initiated, will complete its stroke and automatically return to its initial position for subsequent cooperation with a succeeding basket placed on the loading table.

A still further object of the invention is to provide a transfer mechanism of this sort having associated therewith a novel form of transfer head and guide means therefor whereby, when the head is retracted, it assumes a lowered position beneath the level of the path of movement of the oncoming work basket so that the latter may pass completely over the head, after which, when forward impelling movement is imparted to the head, it automatically rises and projects itself into such path of movement so that it will engage a work basket previously deposited in the furnace by the loading head and impel the same from the furnace onto the quench tank elevator associated with the quench apparatus.

In carrying out this last mentioned object, briefly, the invention contemplates the provision of a novel form of hearth construction within the heat treatment furnace and over which the work baskets are slidable, the hearth construction having associated therewith guide means for the transfer head including a ramp portion over which the head moves in an upward direction at the commencement of its operative impelling stroke and over which it moves in a downward direction toward the end of its return stroke, the mechanism by means of which the transfer head is moved being disposed wholly outside the confines of the furnace and completely disassociated from the hearth construction.

Yet another object of the invention is to provide a loading table for heat treatment furnaces of the character briefly outlined above having associated therewith movable carriage devices, one for the loading head and the other for the transfer head, together with means for interdependently controlling the movements of the carriage devices whereby the operation of the loading and transfer head is effectively controlled in a localized region exteriorly of the furnace and quench tank apparatus.

The provision of a transfer mechanism which, when considering the number of functions which it fulfills, is of relatively simple construction, thereby contributing to economy in the manufacture thereof; one which is comprised of a minimum number of moving parts and which, therefore, is unlikely to get out of order; one which is rugged and durable and which, therefore, is unlikely to get out of order even though subjected to rough treatment; one in which the various operative parts thereof are exposed to view and are also accessible for purposes of inspection, replacement of parts or repair; one which is efficient in its operation; and one which is otherwise well adapted to perform the services required of it, are further desirable features which have been borne in mind in the production and development of the present invention.

Numerous other objects and advantages of the invention, not at this time enumerated, will become more readily apparent as the following description ensues.

In the accompanying six sheets of drawings forming a part of this specification, a preferred embodiment of the invention has been shown.

In these drawings.

Referring now to the drawings in detail, and in particular to Fig. 1, the invention, for exemplary purposes, has been illustrated in connection with the movement of work trays or baskets which are loaded with small articles to be heat treated in a substantially straight path extending from the receiving end of a loading table 10, through a heat treatment chamber or furnace 12 and a quenching apparatus 14, to the discharge end of an unloading table 16. The four instrumentalities 10, 12, 14 and 16 are arranged in alignment for successive passage of the work baskets, several of which have been shown in dotted lines and designated at 18, therethrough or therealong, as the case may be. The specific nature of the heating furnace 12, except insofar as the hearth construction thereof is concerned, forms no part of the present invention, it being deemed sufficient for descriptive purposes to state that the furnace is provided with top and bottom walls 20 and 22, respectively, front and rear walls 24 and 26, respectively, and side walls, only one of which appears at 28. The various furnace walls are refractory lined as at 30 and the wall structure as a whole defines an interior heat treatment chamber 32 having an entrance vestibule 34 adapted to be closed by a refractory lined door 36, and an exit vestibule 38 adapted to be closed by a refractory lined door 40. The atmosphere within the heat treatment chamber 32 may be regulably controlled by the application of heat thereto in any suitable manner, conventional radiant tubes 42 which extend vertically through the chamber 32 being employed for this purpose in the illustrated form of the invention. The furnace 12 is provided with a hearth construction 44 of novel design and which cooperates with the transfer instrumentalities of the present invention in effecting movement of the work baskets 18 through the furnace, all in a manner that will be made clear presently.

The rear wall 26 of the furnace 12 constitutes the front wall of the quench tank apparatus 14, the latter apparatus further including top and bottom walls 50 and 52, respectively, a rear wall 54 and side walls, one of which appears at 56. The discharge opening 58 for the heating chamber 32 constitutes the entrance opening for the quench tank apparatus 14, this opening 58 communicating with the exit vestibule 38, as well as with the quench tank chamber 60 which exists above the level of the quench liquid 62 within the tank structure. The quench apparatus 14 is provided with an elevator 64 which is movable between the elevated position in which it is illustrated in Fig. 1 wherein it is disposed above the level of the liquid 62, to a lowered position wherein it is submerged within the liquid, the movements of the elevator taking place under the control of a suitable actuator 66 including a cylinder 68 and piston 70 slidable therein, the latter being operatively connected through a piston rod 72 to the elevator 64. The elevator 64 provides a platform 73 including a series of rollers 74 which, when the elevator 64 is in its uppermost position, is at the level of the furnace floor or hearth 44. The tank wall 54 is provided with a discharge opening 75 adapted to be closed by a door 76. The work baskets 18 are adapted to be discharged from the platform 73 through the discharge opening 75 and onto the unloading table 16, the latter including a platform 76 having rollers 77 associated therewith. The liquid 62 contained in the quench tank is maintained at quenching temperatures by conventional oil manifolds 78 which are operatively connected to a suitable oil cooling device 79. The entrance vestibule door 36, the exit vestibule door 40 and the quench tank door 72 are all hydraulically operated, suitable piston and cylinder devices 80, 82 and 84, respectively, being employed for this purpose. The arrangement of parts thus far described is more or less conventional and the illustration thereof in Fig. 1 has been somewhat schematic. The present invention is concerned essentially with the novel construction, combination and arrangement of parts of the transfer mechanism by means of which the work baskets 18 are moved from the loading table 18 into the heat chamber 32 and from thence into the chamber 60 of the quench tank 14 and finally are discharged to the unloading table 76 as will now be described in detail.

Figure 1:
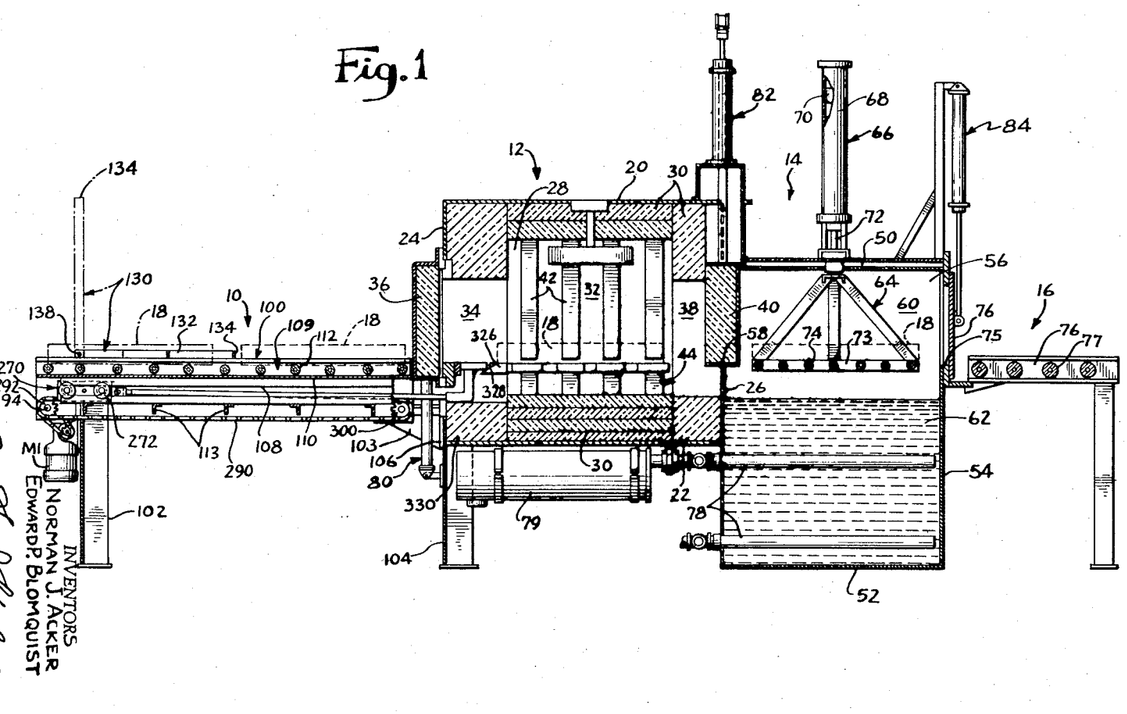
Fig. 1 is a longitudinal view, partly in section and partly in elevation, of a heat treatment apparatus, showing the improved transfer mechanism of the present invention operatively applied thereto.
Figure 2:
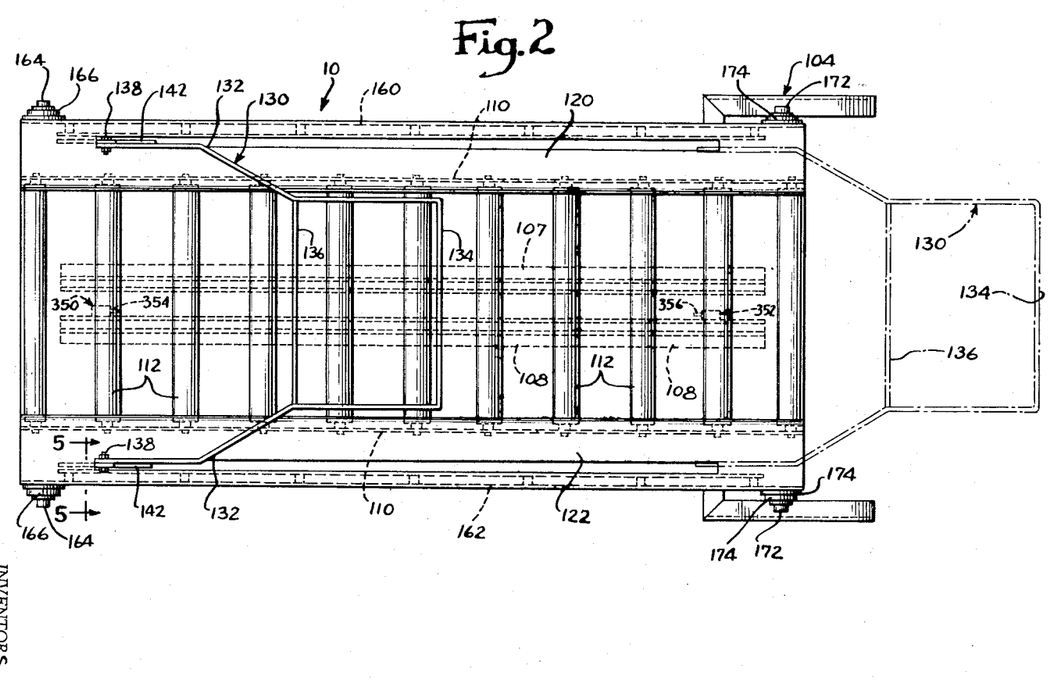
Fig. 2 is a plan view of the loading table employed in connection with the present invention.
Figure 3:
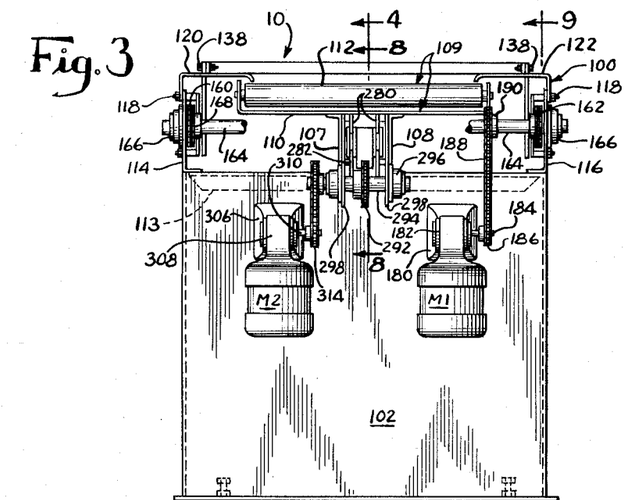
Fig. 3 is an end elevational view of the structure shown in Fig. 2.

Still referring to Fig. 1 and additionally to Figs. 2, 3, 4 and 5, the transfer mechanism of the present invention, or at least the operable moving parts thereof, are associated with and are operatively mounted upon the loading table 10. The loading table 10 involves in its general organization a generally horizontal platform assembly 100, the receiving end of which is supported on a relatively heavy gauge sheet metal leg or support 102 and the discharge end of which is supported upon a transversely extending bracket assembly 103, the forward end of which is welded as at 106 (Figs. 1 and 4) to the front wall 24 of the furnace 12. The entrance end of the furnace 12 is supported on a leg 104 similar to the leg 102. Extending between the leg structure 102 and bracket 103 longitudinally and centrally of the platform assembly 100 are a pair of closely spaced channel members 107 and 108 (Fig. 3). Centered and supported upon the upper edges of the channel members 107 and 108 is a roller assembly 109 including a shallow trough member 110 across which there extends a series of basket-supporting rollers 112, the roller assembly 109 extending throughout the entire length of the table 10. A series of transverse members 113 are welded or otherwise secured to the underneath sides of the channel members 107 and 108 and extend transversely of the platform assembly. Supported on the transverse members 113 at the opposite ends thereof are a pair of longitudinally extending side pieces 114 and 116 in the form of angle members to which there are bolted as at 118 along the upper edges thereof a pair of basket guards 120 and 122, respectively, these guards extending inwardly and overlying the edge regions of the roller assembly 109. The various parts 102 to 122, inclusive, described above constitute the stationary framework structure of the loading table 10 and such a structure may be employed for introducing work baskets such as those shown at 18 into the furnace 12 through the vestibule door 36 thereof by a manual operation when the transfer mechanism of the present invention is not employed. In such instances, the baskets 18 are manually pushed or impelled along the roller assembly 109 with the baskets being guided against horizontal displacement by the basket guides 120 and 122. At such time as it is desired to introduce a particular basket into the heat treatment chamber 32, the door 36 is opened and the basket is simply manually pushed from the platform assembly through the entrance opening of the furnace and into the vestibule 34. Where automatic transfer operations are desired according to the present invention, the various transfer operations are desired according to the present invention, the various transfer instrumentalities of the present invention which are about to be described are operatively installed upon this framework structure.

Figures 4, 5:
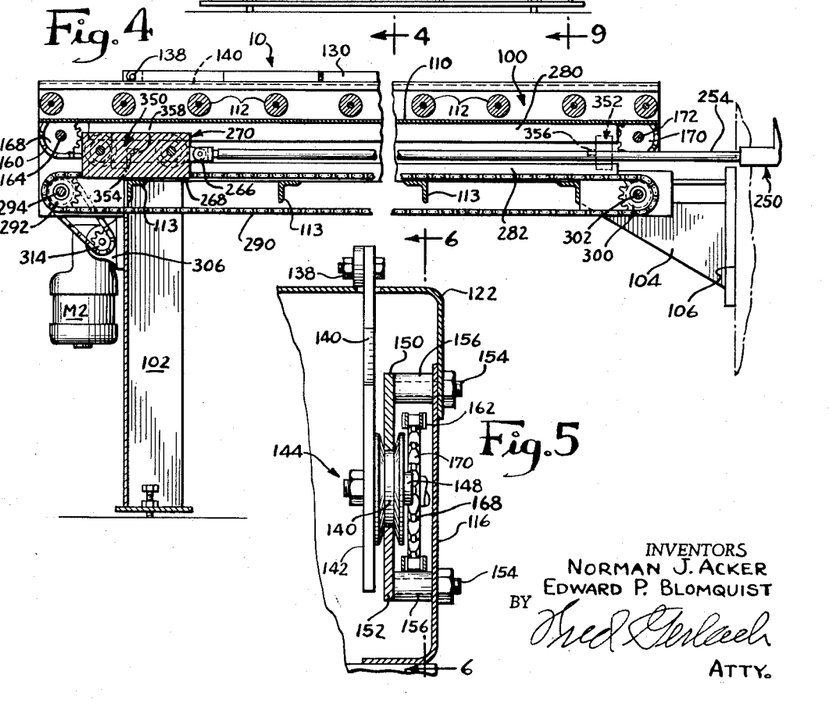
Fig. 4 is a sectional view taken substantially along the line 4—4 of Fig. 3.
Fig. 5 is an enlarged sectional view taken substantially along the line 5—5 of Fig. 2.

Referring now to Figs. 1 and 5, inclusive, loaded or filled work baskets 18 which are manually placed upon the receiving end of the roller assembly 109 (which is the left-hand side of the structure as seen in Fig. 1) are adapted to pass through and beneath a pusher frame or "bail" 130 which is reciprocable longitudinally of the table 10 and which assumes a vertical out-of-the-way position as shown in broken lines in Fig. 1 at the time the basket is initially applied to the table. The basket is adapted to be slid forwardly along the table from the extreme left-hand full line position in which it is shown in Fig. 1 to the next adjacent dotted line position thereof, at which time the trailing edge of the basket 18 clears the forward leading edge of the pusher frame 130 when the latter is moved to its horizontal retracted basket-impelling position as shown in full line. After the pusher frame 130 has been lowered to its horizontal position, power actuated means are energized whereby the frame is caused to move forwardly along the table 10 to impel the basket 18 forwardly into the furnace 12, after which the horizontally disposed pusher frame 130 is returned to its initial position.

Still referring to Figs. 1 to 5, inclusive, the pusher frame 130 is in the form of an open flat planar structure of generally U-shaped configuration and including side members 132, the forward ends of which are connected by a transverse base member 134 which constitutes a pusher bar for the various work baskets 18. The side members 132 are connected intermediate their ends by a transverse reinforcing strut 136 which lends rigidity to the frame structure as a whole. The rear ends of the side members 132 are widely separated while the forward ends thereof are brought within the lateral confines of the roller assembly 109. The extreme rear ends of the side members 132 are pivoted as at 138 to respective upstanding ears 140 provided on a pair of carriage plates 142 (see also Figs. 6, 7 and 9) which are mounted for longitudinal travel along the table 10 on the opposite sides thereof. The carriage plates 142 constitute elements of a pair of reciprocable carriage assemblies, each of which has been designated at its entirety at 144, and which assemblies, together with the supporting means therefor, are substantially identical in construction so that a description of one will suffice for the other.

Figure 6:
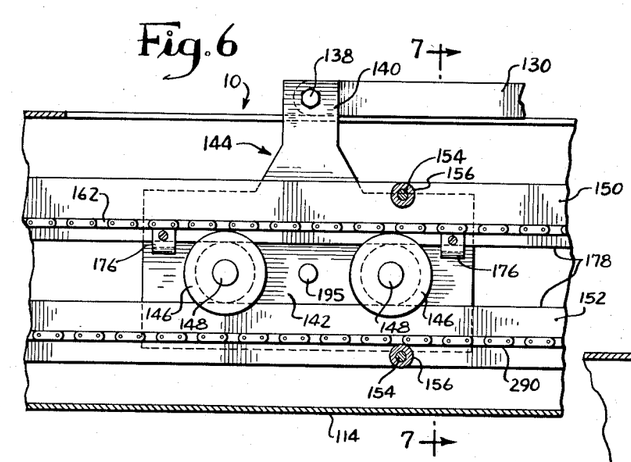
Fig. 6 is an enlarged sectional view taken substantially along the line 6—6 of Fig. 5.
Figure 7:
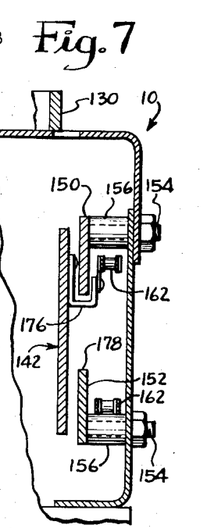
Fig. 7 is a sectional view taken substantially along the line 7—7 of Fig. 6.

As best seen in Figs. 5, 6 and 7, each carriage assembly 144 is comprised of the plate 142, together with traction means in the form of a pair of spaced flanged rollers 146 mounted on studs 148 carried by the plate 142 and confined between upper and lower guide rails 150 and 152, respectively (Fig. 4). The rails 150 and 152 are supported inwardly of the angle pieces 116 by suitable studs 154 and spacing collars 156. The guide rails 150 and 152 are substantially coextensive with the loading table 10 so that the two carriage assemblies 144 are movable between retracted positions adjacent the receiving end of the loading table 10 and advanced positions adjacent the discharge end thereof, the pusher frame 130, of course, being bodily movable with the carriage assembly.

Figure 8:
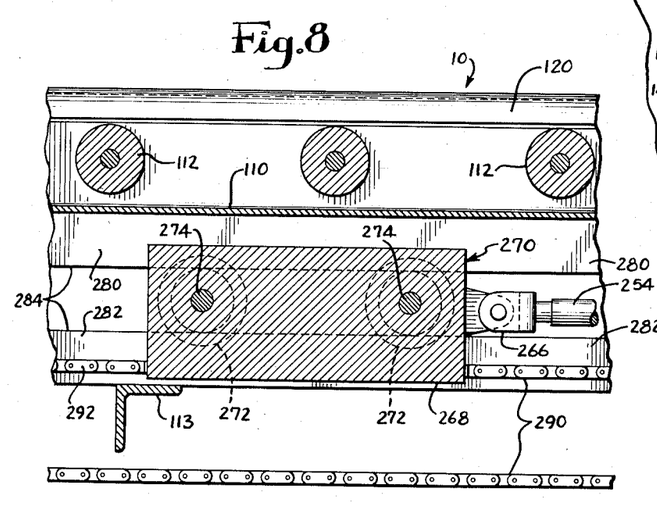
Fig. 8 is an enlarged sectional view taken substantially along the line 8—8 of Fig. 3.

In order to move the two carriage assemblies 144, and consequently the pusher frame 130, between retracted and advanced positions, a dual-chain conveyor system is employed including endless chains 160 and 162, respectively (Fig. 3), which extend along the side rails 114 and 116 on opposite sides of the table 10. The chains 160 and 162 are adapted to be driven in unison by means of a conveyor drive shaft 164 which extends transversely across the table 10 and has its opposite ends journalled in bearing assemblies 166 (Fig. 3) carried by the frame members 114 and 116, respectively. A pair of driving sprockets 168 (Figs. 3, 5 and 8) are mounted on the shaft 164 in close proximity to and inside of the frame members 114 and 116, each sprocket serving one of the chains 160 or 162 as the case may be. The chains 160 and 162 are supported adjacent the discharge end of the table 10 on driven sprockets 170 carried on a transverse shaft 172, mounted in bearings 174 (Fig. 2) on opposite sides of the table.

Referring now to Figs. 6 and 7, in order to operatively connect the two carriage plates 142 to their respective driving chains 160 and 162, each plate has suitably anchored thereto as, for example, by welding, a pair of U-shaped connectors 176, the two connectors passing through the slot 178 existing between the adjacent edges of the guide rails 150 and 152 and being secured to respective chain links in the upper straightaway portion thereof. Thus, it will be seen that as the chain is driven in either direction, the motion of the upper straightaway portion thereof will be transmitted through the pair of connectors 176 to each carriage plate 142 so that the entire carriage assembly 144 associated therewith will be constrained to follow the movements of the chain. The chains 160 and 162 are adapted to be driven in unison in either direction by means of a reversible motor M1 (Figs. 3 and 9) mounted on a bracket 180 secured to the front leg structure 102 and having associated therewith a gear reduction device 182 provided with an output shaft 184 having a driving sprocket 186 mounted thereon. A drive chain 188 passes over a driven sprocket 190 mounted on the shaft 164 and serves to connect the sprockets 190 and 186 in driving relationship.

Figure 9:
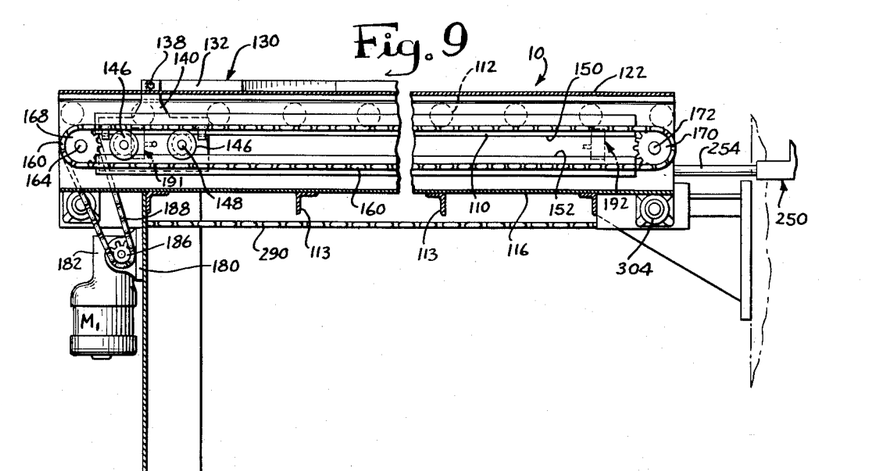
Fig. 9 is a sectional view taken substantially along the line 9—9 of Fig. 3.
Figure 12:
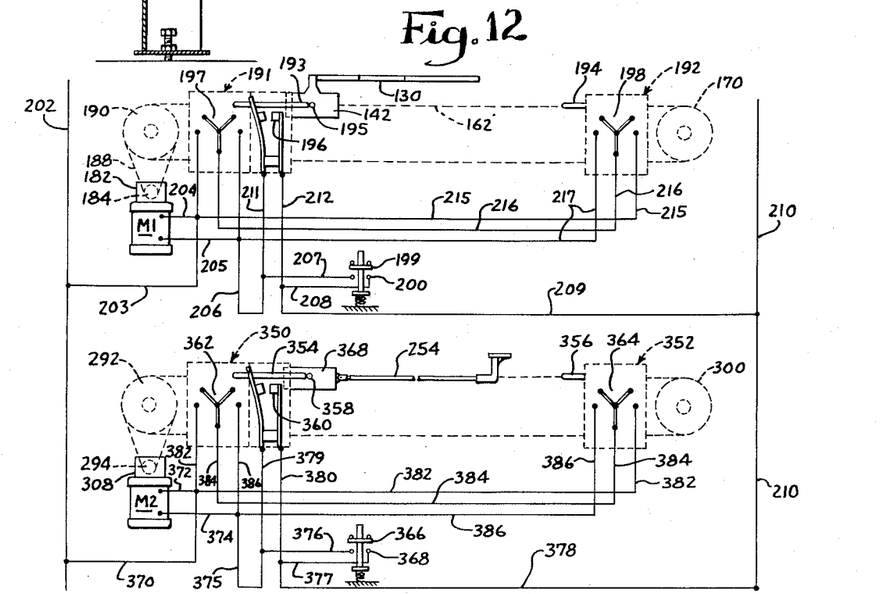
Fig. 12 is a circuit diagram showing the electrical instrumentalities associated with the transfer mechanism of the present invention.

Referring now to Figs. 9 and 12, in order to control the movement of the pusher frame 130, a pair of limit switches 191 and 192 are mounted on the guide rails 150 and 152 at one side of the loading table 10 adjacent the opposite ends of the latter and have operating fingers 193 and 194, respectively, positioned in the path of movement of an actuating pin 195 mounted on the carriage plate 142 between the two rollers 146. The limit switch 191 is in the form of a compound switch assembly including a pair of normally closed contacts 196 adapted to become open when the finger 193 is engaged by the pin 195. The switch 191 further includes a reversing switch 197, operable under the control of the finger 195 to reverse the direction of current flow to the field windings of the motor M1. The limit switch 192 includes a reversing switch 198, operable when the actuating finger 194 is engaged by the pin 195 to reverse the direction of current flow to the field windings of the motor M1. A spring-loaded start switch 199 in the form of a pair of normally open push button controlled contacts 200 are arranged in shunt relationship with respect to the contacts 196 and these contacts 200, when closed, serve to energize the motor M1, regardless of the condition of the contacts 196.

In the operation of the pusher frame 130 and its driving mechanism, prior to placement of any given work basket 18 on the work table 10, the pusher frame 130 is moved to the vertical broken line position in which it is illustrated in Fig. 1. In such position the cross member or strut 136 is sufficiently elevated above the working level of the table that a loaded work basket 18 may be passed through the arch formed by this cross member and the adjacent side members 132 of the frame. The basket is placed on the extreme receiving end of the table 10 so that it rests upon the rollers 112 and it is then manually slide forwardly until it assumes the dotted line position of the second basket from the left-hand end of Fig. 1 wherein the trailing edge thereof is spaced forwardly a slight distance from the forward end of the pusher frame 130 when the latter is lowered to its full line position. After the basket 18 has thus been manually advanced along the table 10, the pusher frame 130 is moved to its full line position and thereafter the start switch 199 is momentarily depressed, thus closing the pair of contacts 200 to energize the circuit for the motor M1. As shown in Fig. 9, this circuit extends from one side 202 of the power line through leads 203 and 204, the motor M1, leads 205, 206 and 207, contacts 200, and leads 208, 209, to the other side 210 of the power line. Immediately upon energization of the motor M1, the conveyor chains 160 and 162 are driven so that the carriage plates 142 are moved forwardly. As soon as the carriage 142 shown in Fig. 12 moves out of contact with the operating finger 194 of the switch assembly 191, the pair of normally closed contacts 196, which previously had been maintained open under the influence of the finger 193, become closed thus maintaining the motor circuit energized through a circuit extending from the power line through leads 203, 204, motor M1, leads 205, 206, 211, contacts 196 and leads 212, 209 to the other side of the power line. The two carriage plates 142, and consequently the pusher frame 130 continue their forward movement along the table 10 and the pusher bar 134 (Figs. 1 and 2) engages the trailing edge of the previously deposited work basket 18 and impels the basket forwardly toward the furnace 12. Immediately prior to arrival of the loaded work basket 18 at the furnace 12, the piston and cylinder assembly 80 is actuated by means which form no part of the present invention and the door 36 of the furnace entrance vestibule 34 is raised to admit the loaded basket onto the furnace hearth 44 which has an operating level substantially the same as the operating level of the loading table 10. After the work basket has been thus introduced into the heating chamber 32 of the furnace so that it rests upon the hearth structure 44, the pin 195 on the carriage plate 142 engages the operating finger 194 (Fig. 9) of the limit switch assembly 192 whereupon the field windings of the motor M1 are reversed by appropriate interchanging of the terminals of the leads 215, 216 and 217 so that the conveyor chains 160 and 162 are driven in the opposite direction, thus returning the carriage assemblies 144 to their initial starting position and withdrawing the protruding end of the pusher frame 130 from the furnace heating chamber 32. As the carriage plate 142 approaches the limit of its rearward movement, the pin 195 engages the operating finger 193 of the switch assembly 191, thus opening the pair of normally closed contacts 196 and stopping the operation of the motor M1. At the same time the reversing switch 197 is actuated to condition the circuit of the field windings of the motor for forward impelling movement of the carriage assemblies 144 when the start switch 199 is again depressed.

Figures 10, 11:
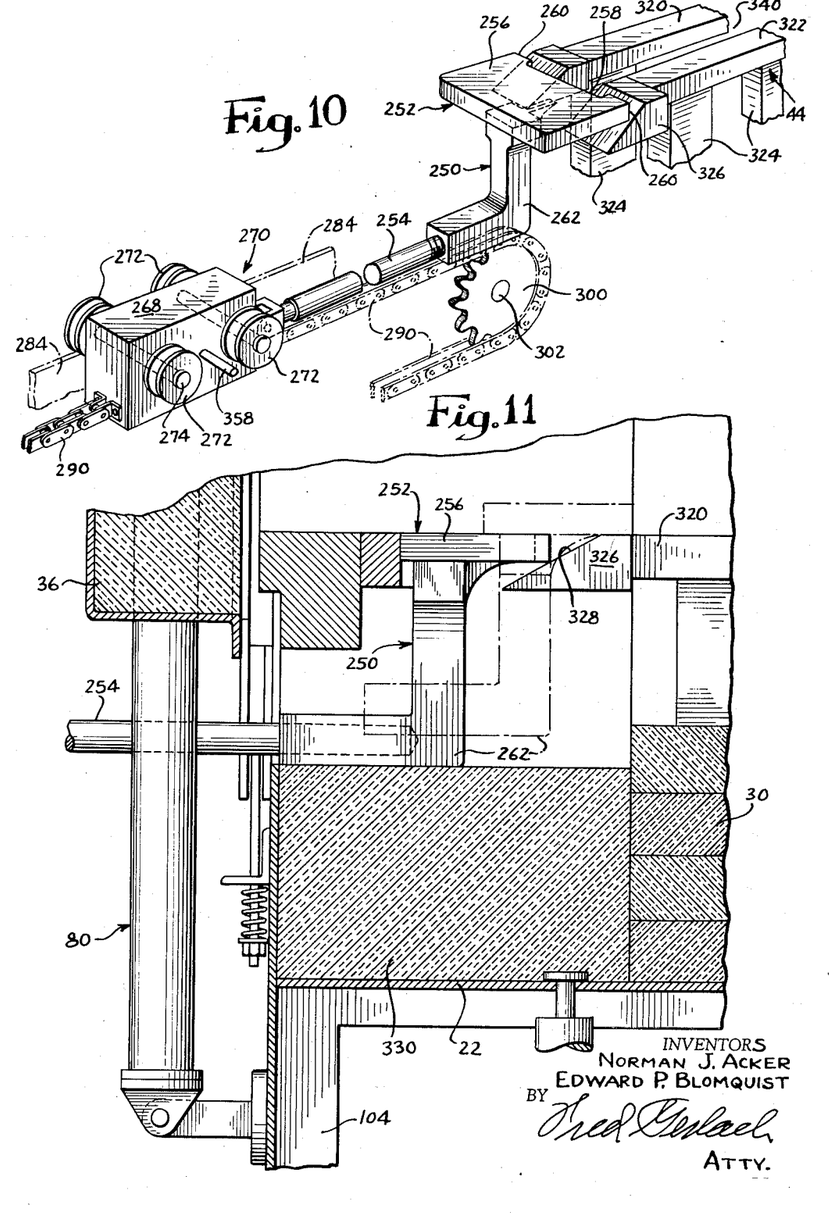
Fig. 10 is a perspective view, somewhat schematic in its representation, illustrating a transfer head employed in connection with the present invention, its associated driving mechanism and the manner in which it is guided through the furnace hearth.
Fig. 11 is an enlarged sectional view taken longitudinally through the entrance vestibule of the heat treatment furnace and illustrating the operation of the transfer head therein.

Referring now to Figs. 1, 4, 8 and 10, wherein the transfer mechanism for moving the baskets 18 from the heat treatment chamber 32 to the quenching apparatus 14 is best illustrated, the actual impelling instrumentality by means of which the work baskets 18 are moved comprises a transfer head assembly 250, the details of which are clearly illustrated in Fig. 10. The transfer head assembly 250 includes a transfer head proper 252 and a pusher or thrust rod 254 therefor. The transfer head 252 involves in its general organization a pusher block 256 of generally rectangular configuration which may be in the form of a casting. The block 256 is generally rectangular and the leading edge thereof is provided with a shallow cut-away portion 258 providing a pair of pusher arms 260 on opposite sides thereof. The block 256 has secured to the underneath side thereof one end of an L-shaped shank portion 262 and the other end of this shank portion threadedly receives therein the forward end of the pusher or thrust rod 254. The rear end of the pusher rod 254 is operatively pivoted by means of a yoke assembly 264 to a forwardly projecting ear 266 (see also Fig. 4) provided on a carriage block 268. The carriage block 268 forms an element of a transfer carriage assembly designated in its entirety at 270. This latter assembly further includes two pairs of supporting rollers 272, each roller being of the flanged type similar to the rollers 146. The various rollers 272 are mounted on shafts 274 in such a manner that two rollers are disposed on each lateral side of the block 268.

The transfer carriage block 268 is guided in its path of travel along the table structure 10 by two pairs of guide rails including upper guide rails 280 and lower guide rails 282 (Figs. 3, 4 and 8), the pairs of rails being similar to the guide rails 150 and 152 associated with the carriage plates 142 and similarly spaced vertically one above the other. The pairs of rollers 272 on opposite sides of the carriage block 268 are confined within the elongated slots 284 defined by the rails 280 and 282 and thus the carriage assembly is movable along the table structure 10 longitudinally thereof from a retracted position near the receiving end of the structure to an advanced position near the discharge end thereof.

The carriage block 268 is movable bodily with the upper straightaway portion of an endless conveyor chain 290, of which it forms a part, the block being interposed between the two adjacent end links of the conveyor chain and thus constituting, in effect, a chain link in itself. The conveyor chain 290 passes over a driving sprocket 292 (Figs. 1, 3 and 4) carried on a shaft 294 mounted in bearings 296 supported on a pair of plates 298 suitably secured to the angle pieces 107 and 108. The chain 290 also passes over a driven sprocket 300 mounted on a shaft 302 journalled in bearings 304 (Fig. 9) supported on the angle pieces 107 and 108.

The carriage assembly and chain 290 are movable in opposite directions under the control of a second electric motor M2 (Figs. 3, 4 and 12), the latter being mounted on the leg structure 102 alongside the motor M1 by means of a supporting bracket 306. The motor M2 has associated therewith a gear reduction device 308 having an output shaft 310. A drive chain 312 passes over sprockets 314 and 316 mounted on the shafts 310 and 274, respectively.

Referring now to Figs. 1, 10 and 11, the pusher rod 254 which is pivoted at its rear end to the carriage block 268 extends forwardly of the loading table 10, passes beneath the entrance vestibule door 36 of the furnace 12 and projects into the entrance vestibule 34 so that the transfer head proper 252 carried thereby assumes a position within the entrance vestibule 34 when the carriage 270 is in its fully retracted position. The hearth construction 44 of the furnace 12 is in the form of a refractory grid including a pair of generally centrally located longitudinally extending grid members or rails 320 and 322 (Fig. 10) disposed in spaced relationship and supported at approximately the level of the roller platform assembly 100 by certain of the various vertically extending refractory grid members 324 associated with the hearth construction 44. The forward ends of the grid members 320 and 322 are provided with enlargements 326 thereon, each of which is formed with a forwardly and upwardly inclined ramp surface 328, these surfaces 328 extending somewhat below the level of the basket-supporting level of the grid rails 320, 322. In the fully retracted position of the transfer head assembly 250, the L-shaped shank 262 of the transfer head pusher plate 256 is adapted to rest by gravity upon a supporting block 330 (Fig. 1) with the transfer head pusher block 256 lying wholly below the plane of the tray-supporting surfaces provided by the grid rails 320 and 322. Upon forward advancing movement of the thrust rod 254 and transfer head assembly 250 attached thereto, the pusher fingers 260 on the pusher block 256 move into engagement with the inclined ramp faces 328 and ride upwardly and forwardly therealong. As the transfer head assembly 250 continues in its forward movement, the underneath surfaces of the block 252 in the side regions thereof slide onto the upper faces of the grid rails 320 and 322 so that the entire weight of the transfer head assembly is borne by these members. The vertical portion of the L-shaped shank 262 enters into the slot 340 existing between and defined by the grid rails 320 and 322 so that the transfer head assembly 250 may proceed forwardly into the heating chamber 32. In so moving, the fingers 260 provided on the block 256 engage the trailing edge of a previously deposited work basket 18 supported on the grid rails 320 and 322 and impel the basket forwardly and outwardly through the discharge opening 58, it being understood, of course, that the refractory door 40 will become elevated to permit such discharge of the work basket 18.

It is to be noted from an inspection of Figs. 10 and 11, that the forward regions of the block 256 project forwardly of the shank 262 an appreciable distance so that this forwardly projecting portion of the block 256 may actually extend outwardly through the opening 58 and impel the work tray 18 completely from the exit vestibule 38 and onto the receiving platform 73 of the quench tank elevator 64. When the transfer head assembly 250 assumes its extreme forward position, the vertical portion of the shank 262 will assume a position in close proximity to the rear wall 26 of the furnace with the forward edge regions of the block 256 projecting into the quench tank chamber 60. Immediately after a particular work basket 18 has thus been discharged from the heat treatment chamber 32 into the quench tank chamber 60, the transfer head assembly 250 and its thrust rod 254 are adapted to be returned to their initial retracted positions.

Referring now to Figs. 2 and 12, in order to control the movement of the transfer head assembly 250, a pair of limit switches 350 and 352 are mounted on one of the pairs of guide rails 280, 282 adjacent the opposite ends of the latter and have operating fingers 354 and 356, respectively, positioned in the path of movement of an actuating pin 358 mounted on the carriage block 268 between two of the rollers 272 on one side of the block. The limit switch 350 is similar to the previously described limit switch 192 and is in the form of a compound switch assembly including a pair of normally closed contacts 360 adapted to become open when the pin engages the finger 354. The limit switch 350 further includes a reversing switch 362, operable under the control of the finger 354 to reverse the direction of current flow to the field windings of the motor M2. The limit switch 352 includes a reversing switch 364 operable when the actuating finger 356 is engaged by the pin 358 to reverse the direction of current flow to the field windings of the motor M2. A start switch 366 in the form of a pair of normally open push button contacts 368 are arranged in shunt relationship with respect to the contacts 360 and the contacts 368 are adapted, when closed, to energize the motor M2 regardless of the condition of the contacts 360.

In the operation of the electrical system for controlling the movement of the carriage assembly 270 which includes the movable carriage block 268, reference being had to Fig. 12, after a work basket 18 has been pushed into the heat treatment chamber 32 by the pusher frame 130 and deposited on the hearth 44 in the manner previously described, the start switch 366 is depressed, thus bridging the contacts 368 associated with the same, whereupon the circuit for the motor M2 is energized. This circuit extends from the power line 202, through leads 370, 372, the motor M2, leads 374, 375, 376, contacts 368, and leads 377, 378 to the other side 210 of the power line. Immediately upon energization of the motor M2, the conveyor chain 290 is driven so that the carriage block 268 is moved forwardly. As soon as the carriage block 268 moves out of contact with the operating finger 354 of the switch assembly 350, the pair of normally closed contacts 360 which previously had been maintained open under the influence of the finger 354 becomes closed thus maintaining the motor circuit energized through a circuit extending from the power line through leads 370, 372, motor M2, leads 374, 375, 379, contacts 360, and leads 380, 378 to the power line 210. The carriage block 268, and consequently, the transfer head assembly 250, continue their forward movement along the table 10 and the pusher block 256 engages the trailing edge of the previously deposited work basket 18 and impels the basket forwardly and out of the furnace through the exit vestibule, and door 38 and 40, respectively, in the manner previously described. It will be understood, of course, that immediately prior to arrival of the work basket 18 at the discharge opening 58 of the furnace, the piston and cylinder assembly 82 will be actuated to elevate the door 40 and allow the work basket to be transferred to the quench tank chamber 60. At such time as the pin 358 on the carriage block 268 engages the operating finger 356 of the limit switch 352, the motor windings of the motor M2 are reversed by appropriate interchanging of the terminals of the leads 382, 384 and 386 so that the conveyor chain 290 is driven in the opposite direction, thus returning the carriage block 268 to its initial starting position and bringing the transfer head assembly back to its lowered position in front of the inclined ramp surfaces 328 so that the next succeeding basket may be placed upon the furnace hearth without interference by any portion of the transfer head assembly. As the carriage block 268 approaches the limit of its return movement, the pin 358 engages the operating finger 354 of the switch assembly 350, thus opening the pair of normally closed contacts 360 to open the motor circuit and stop the operation of the motor M2. At the same time, the reversing switch 362 is actuated to condition the circuit of the field windings of the motor for forward impelling movement of the carriage block 260 when the start switch 366 is again depressed.

It is to be noted from an inspection of Fig. 1 that each time one of the work baskets 18 is impelled from the heat treatment chamber 32 through the exit vestibule 38 and discharge opening 58 of the furnace 12 and deposited on the elevator platform 73 of the elevator assembly 64, the work basket previously introduced into the quenching tank 60 and treated therein by submersion in the liquid 62 is engaged by the oncoming work basket and moved forwardly through the discharge opening 75 for deposition on the platform 76 of the unloading table 16. It will be understood, of course, that the piston and cylinder assembly 84 will be operated to elevate the exit door 78 of the quench tank assembly 14 at the proper time to permit such discharge of the work basket 18.

Although a preferred form of the invention has been shown in the drawings and described herein, it should be understood that the invention is not to be limited to the specific disclosure made, and that the appended claims should be construed as broadly as the prior art will permit.

Having thus described the invention what we claim as new and desire to secure by Letters Patent is:

1. Apparatus comprising in combination; first and second chambers; a supporting surface extending into said first chamber; a first pusher element; first means adjacent said supporting means for reciprocating said first pusher element from a retracted position to a forward position for impelling articles along said supporting surface into said first chamber; a second pusher element having a retracted position underlying said supporting surface; and second reciprocating means independent of said first for reciprocating said second pusher element from said retracted position to a forward position along said supporting surface in said second chamber for impelling articles from said first chamber into said second chamber, said second reciprocating means adjacent said supporting surface and adapted to extend beneath said supporting surface adjacent said first chamber to engage said second pusher element.

2. Apparatus comprising in combination, a first chamber; a supporting surface extending through said first chamber; a first pusher element; first means adjacent said supporting means for reciprocating said first pusher element from a retracted position to a forward position for impelling articles along said supporting surface into said first chamber; a second chamber arranged in aligned relation with said first chamber, said supporting surface continuing into said second chamber; a second pusher element separate from said first pusher element and lying within said first chamber for impelling articles from said first chamber to said second chamber independently of the operation of said first pusher element, said second pusher element having a retracted position underlying said supporting surface; and second reciprocating means for reciprocating said second pusher element from said retracted position to a forward position along said supporting surface in said first chamber for impelling articles from said first chamber into said second chamber, said second reciprocating means underlying said supporting surface and being adapted to extend beneath said supporting surface adjacent said first chamber to engage said second pusher element.

3. Apparatus comprising in combination, a first chamber including inlet and outlet doors adapted for independent operation; a second chamber aligned with said first chamber and having an inlet that is opened and closed by the outlet door of said first chamber; a platform leading to the inlet door of said first chamber; a first pusher element adapted to be reciprocated along said platform for moving articles into said first chamber; means underlying said platform for reciprocating said first pusher element; a second pusher element located inside the inlet to said first chamber and adapted to be reciprocated from a retracted position beneath the floor of said first chamber to a forward position along the floor of said first chamber for moving articles from said first chamber into said second chamber; and means underlying said platform for reciprocating said second pusher element, said means for reciprocating said second pusher element being independent of the means for reciprocating said first pusher element and adapted to extend beneath the floor of said first chamber to engage said second pusher means.

4. Apparatus comprising in combination, a first chamber; a supporting surface leading to said first chamber; a first pusher element; first means underlying said supporting surface for reciprocating said first pusher element from a retracted position to a forward position for impelling articles along said supporting surface into said first chamber; a second chamber arranged in aligned relation with said first chamber; a second pusher element separate from said first pusher element lying within said first chamber and having a retracted position flush with the floor thereof, said second pusher element being adapted for impelling articles along said floor from said first chamber to said second chamber independently of the operation of said first pusher element; second reciprocating means underlying said supporting surface for reciprocating said second pusher element from a retracted position to a forward position for impelling articles along said floor from said first chamber into said second chamber, said second reciprocating means being adapted to extend beneath said floor of said first chamber to engage said second pusher means; and means for causing said second pusher element to be elevated above the floor of said first chamber during the reciprocation thereof.

References Cited in the file of this patent
UNITED STATES PATENTS

| | | |
|---|---|---|
| 876,183 | Herrick | Jan. 7, 1908 |
| 1,428,290 | Kevlin | Sept. 5, 1922 |
| 2,078,905 | Fearnside | Apr. 27, 1937 |
| 2,681,136 | Ipsen | June 15, 1954 |
| 2,716,989 | Joy | Sept. 6, 1955 |
| 2,747,855 | Ipsen | May 29, 1956 |
| 2,782,904 | Sangster | Feb. 26, 1957 |
| 2,842,352 | Tauber | July 8, 1958 |
| 2,898,101 | Hannum et al. | Aug. 4, 1959 |